Sept. 10, 1940.  E. O. MUELLER  2,214,592
MOTOR VENTILATING SYSTEM
Filed Feb. 26, 1938  3 Sheets-Sheet 1

WITNESSES:
Wm. B. Sellers.
Bernard L. Zangwill.

INVENTOR
Erich O. Mueller.
BY O. B. Buchanan
ATTORNEY

Sept. 10, 1940.  E. O. MUELLER  2,214,592
MOTOR VENTILATING SYSTEM
Filed Feb. 26, 1938  3 Sheets-Sheet 2

WITNESSES:
Wm. B. Sellers
Bernard L. Zangwill

INVENTOR
Erich O. Mueller.
BY O. B. Buchanan
ATTORNEY

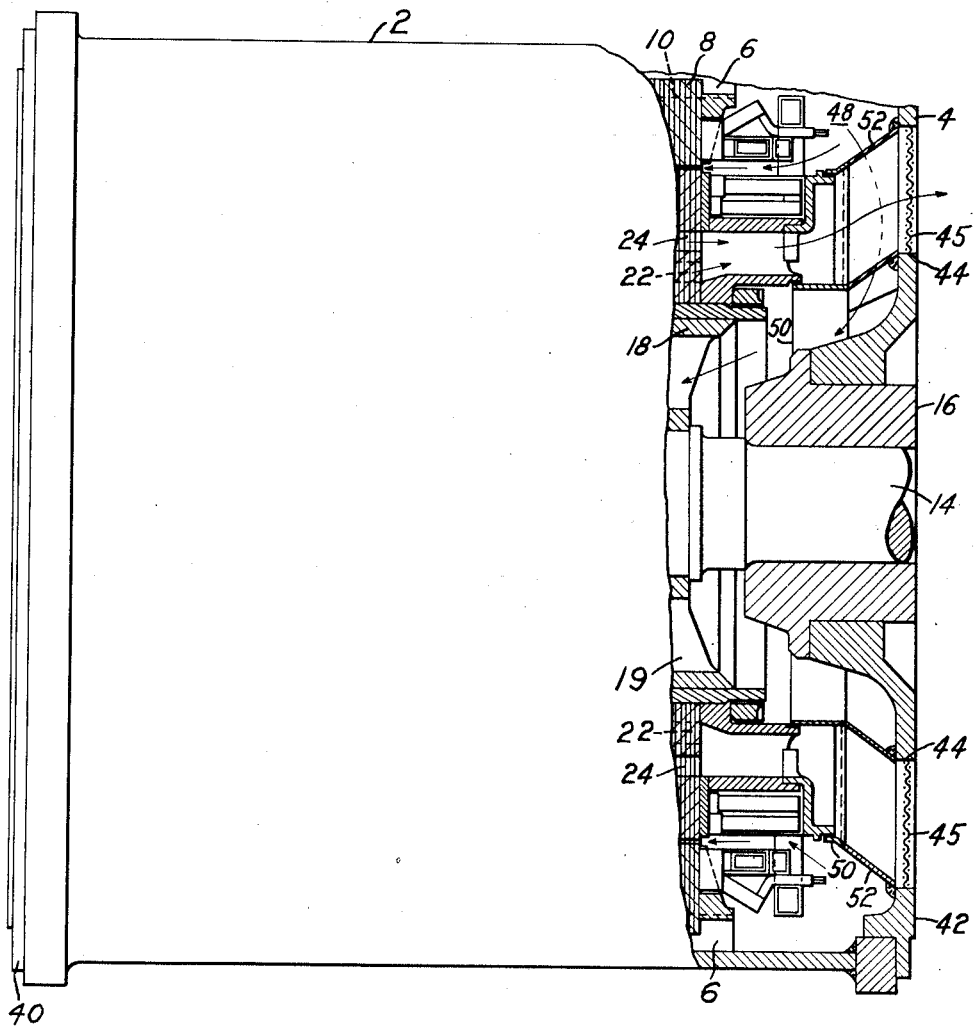

Patented Sept. 10, 1940

2,214,592

UNITED STATES PATENT OFFICE 2,214,592

MOTOR VENTILATING SYSTEM

Erich O. Mueller, Irwin, Pa., assignor to Westinghouse Electric & Manufacturing Company, East Pittsburgh, Pa., a corporation of Pennsylvania Application February 26, 1938, Serial No. 192,762

14 Claims. (Cl. 172—36)

My invention relates to the ventilation of motors of relatively small design compared to their high output rating. In such motors forced ventilation generally under high draft is essential in order that the maximum of efficiency can be attained at most, if not all, loads. An effective ventilation path for the cooling of the motor must, therefore, be provided in such motors. This is particularly necessary in motors such as railway motors which must be designed for exceptionally high power while confined to a limited cubic content.

It is, accordingly, some of the objects of my invention to provide an air path in ventilated motors which will be of especially high efficiency whereby the rating of the motor may be made high; to provide an air path which will give uniform, rapid and even cooling whereby to avoid hot spots which decrease the permissible rating of the motor; and to provide an air path of minimum cubic content relative to the cubic content of the motor parts whereby a larger motor may be designed for a given space.

It is a further object of my invention to provide simple and substantially symmetrical parts for the ventilating system whereby a simple assembly may be had at a minimum manufacturing cost.

My invention is particularly adapted to railway motors and I have chosen a motor of that type in which to disclose the specific embodiment of my invention as required by the patent statutes. It is, of course, to be understood that essential details and principles of operation of my invention are equally applicable to other types of motors.

Figure 1:
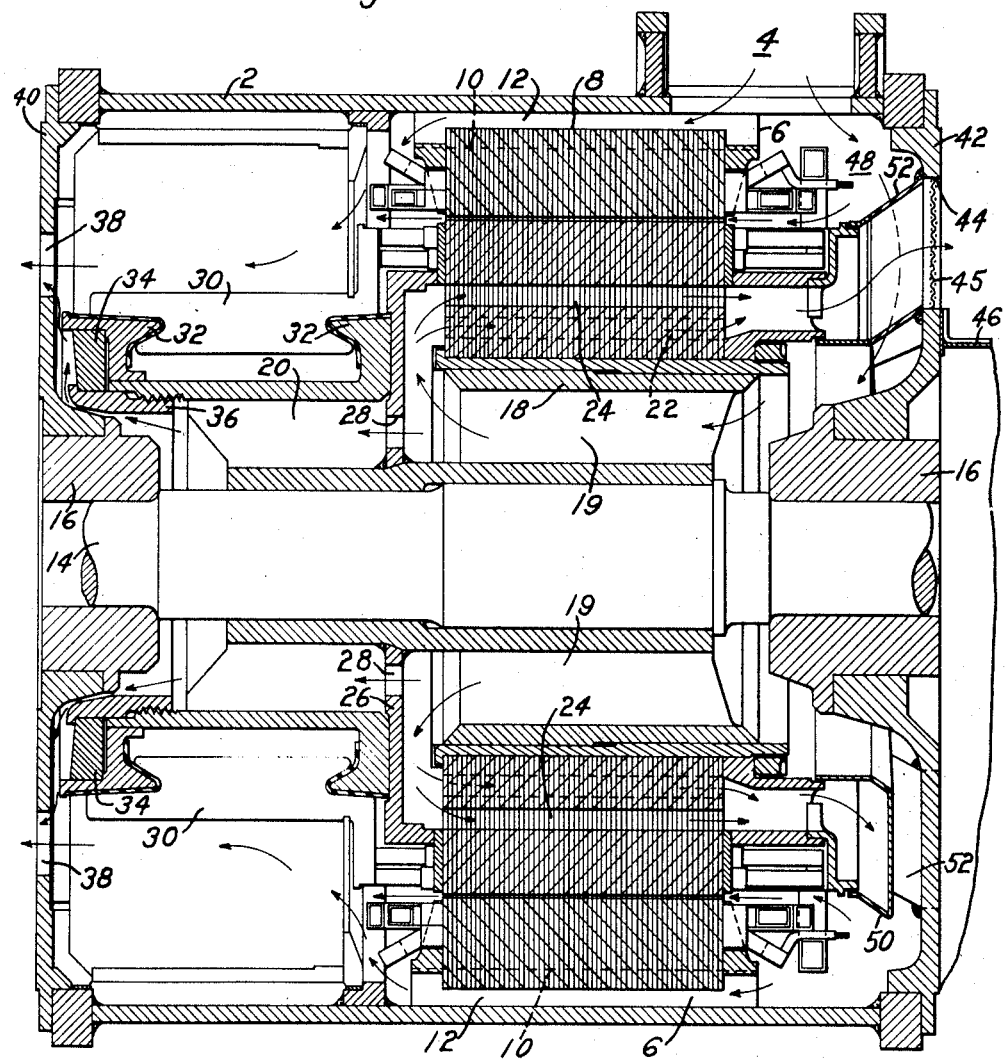
Figure 2:
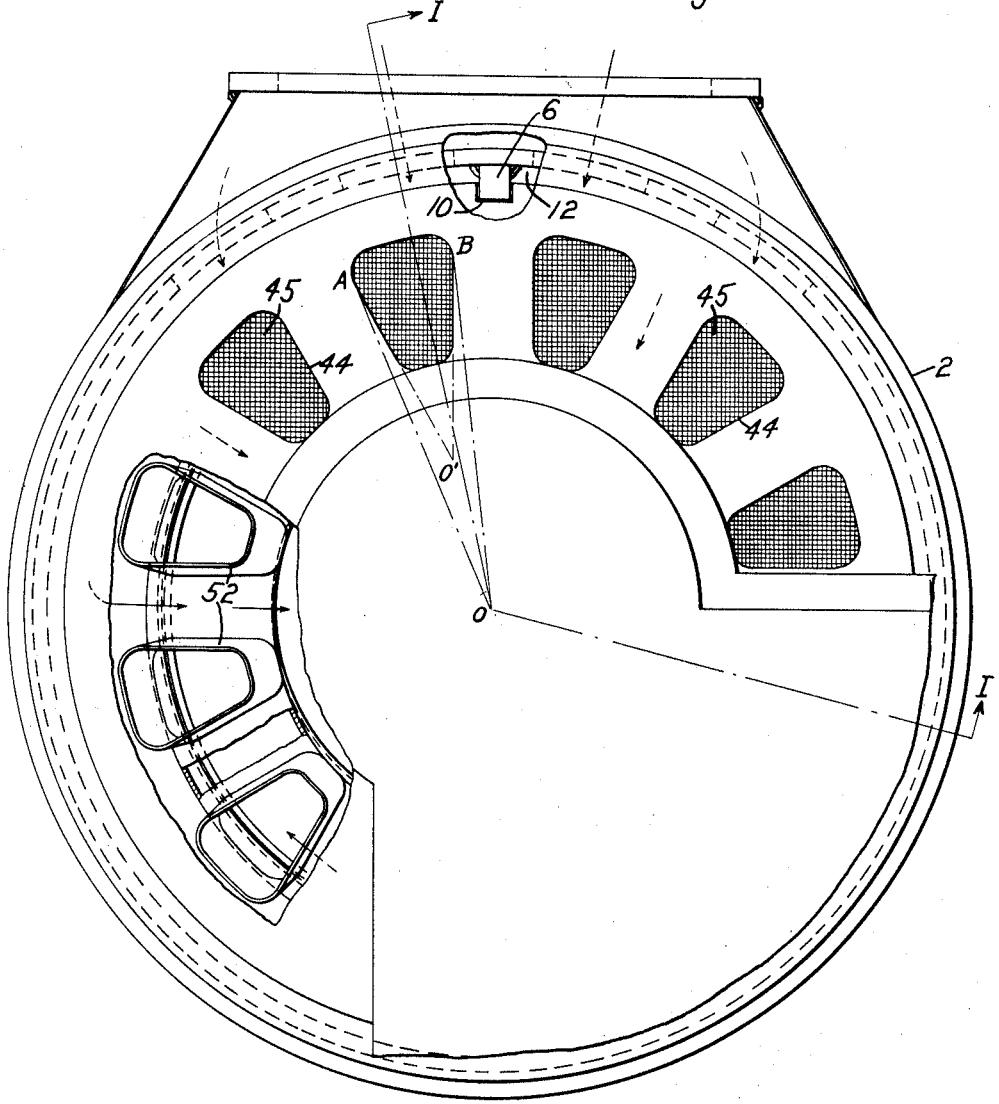

Further objects and novel features of my invention will be apparent from the following description and drawings thereof, in which:

Figure 1 is a longitudinal cross section of a railway motor embodying my ventilating structure and is taken on the lines I—I of Fig. 2, Fig. 2 is an end view of the railway motor of Fig. 1 with some parts broken away to show portions of internal structures, and Fig. 3 is a part longitudinal section similar to that of Fig. 1 of another motor embodying the principles of my invention.

Referring to the drawings, and in particular to Fig. 1, the stator comprises a frame 2 having at one end thereof an air intake 4. The frame can be constructed in a manner well known in the art, as for example, by casting. The frame has fastened thereto keys 6 which are spaced around the inside of the frame. The laminations 8 of the field assembly also form part of the stator and are provided with keyways 10 fitting the keys 6. Although I have shown the field assembly as comprised of laminations, it is quite obvious that any other appropriate iron structure can be used and any other well known means of assembling the field structure to the frame adopted. In the particular construction shown, the field assembly has an outer diameter less than that of the inner diameter of the frame. This construction provides for air passages or ducts 12.

The shaft 14 of the motor is journaled in suitable bearings 16, and has mounted thereon the rotor or armature spider 18 and commutator spider 20. These spiders have spaced ribs for forming air ducts or passages. Upon the armature spider are mounted or fastened laminations 22 which are used in my specific embodiment for the armature magnetic core. The armature core laminations are usually punched with the proper coil slots, and also with holes which when assembled form air ducts. One such duct is shown at 24. Usually, a series of ducts are provided in spaced relation completely around the rotor and while only a single series is shown in Fig. 1, it is obvious that a greater number of series of ducts, radially spaced, may also be utilized. A dish shaped member 26 may be part of the rotor and functions as an air chamber for completing an air conduit between the armature spider ducts 19 and the ducts 24. This dish shaped member is further provided with openings 28 to bypass some of the air flowing in the dish shaped member into the commutator spider ducts.

The commutator assembly is well known in the art and generally comprises commutator bars 30 held clamped between two V's 32 by a spring washer 34 and nut 36. The commutator assembly is constructed to provide an air path from the commutator spider ducts outward and upward to openings 38 in the end housing 40. The commutator is additionally cooled by air flowing from the air ducts 12, over the top of the commutator, and out of the opening 38, as shown by the arrows.

The pinion end closure or housing 42 has a series of openings 44 in spaced relation and covered by screens 45. These openings extend completely around the housing where conditions permit. However, in some types of railway motors a gear box abuts this end of the motor and, as shown in Fig. 1, the openings in such an instance will be made to extend through part of a circumference, the remaining part of the circumference being occupied by the gear box 46, shown only in part.

As shown in Figs. 1 and 3, the stator, rotor and pinion end housing assembly form an air compartment 48. Within this air compartment 48 is a generally U-shaped, annular header 50, juxtaposed to the outlets of the ducts 24. The header has openings to which tubular members 52 are fitted or fastened in any common manner. These tubes extend to the openings in the end closure and form direct passages through which air flowing from the ducts 24 may be expelled.

I prefer to form the tubes of generally trapezoidal cross section, as shown in Fig. 2, the sides of the trapezoids falling within a radial angle formed by radii drawn from the widest extent of said trapezoids. As can be observed in Fig. 2, the radial angle AOB is more acute than the angle AO'B formed by the sides of the trapezoid. I prefer this construction so that the paths between the tubes will be of substantially constant cross sectional dimensions. I can in this manner obtain a flow path for air between and around the tubes which is not constricted in any way. However, while I have shown a cross sectional form for the openings and tubes as generally trapezoidal, I do not desire to be limited to this form inasmuch as any other appropriate section may be used.

The arrows generally indicate the path of ventilating air. Air is admitted under pressure by way of the intake 4 and divides into a number of branches. One of these branch paths is via the ducts 12 over the commutator 30 and out through the openings 38. A second branch is from the air chamber or compartment 48 through the air gap between the stator and rotor, over the commutator and out through the openings 38. The path next to be described involves the general features of my improvement. This path starts at the intake 4, passes into the compartment 48 and then between the tubes 52 to the rotor spider ducts 19. From the spider ducts, a small amount of air passes beneath the commutator via the commutator spider ducts and out through the openings 38 as shown in Fig. 2. The major portion of the air, however, from the armature spider ducts flows into the ducts 24 via the chamber of dish element 26, and from the ducts 24, the air flows into the header 50 and then passes directly out through the tubes 52.

The manner in which the tubes are held in position is one of choice. Many common expedients suggest themselves and will depend on the manufacturing methods employed for obtaining the frame. I prefer to weld the tubes to their associated parts in order to obtain a rigid structure and sealed conduits.

The header itself may be fastened to the frame by welding or by straps and bolts (not shown) where additional rigidity is required. In a motor frame in which one end housing is unitary with the framed yoke, the maximum diameter of the header must not be over that of the diametrical distance between pole faces. This permits the header to be inserted from the same end through which the rotor is inserted. In many cases the tubes themselves may be sufficient to support the header. It is apparent that the manner of supporting the tubes and header in the motor is a matter of choice and design depending largely on the type and size of motor to which my ventilating system is applied.

My construction is of particular advantage in motors in which an air intake and an air exhaust are on the same end. By providing spaced tubes, I am able to have air flow between the tube and into the central ventilating ducts of the motor. Moreover, the air has a freer path to the stator ducts at the bottom of the motor. The intake air is fed through the ventilating ducts with minimum changes of direction and is exhausted from the motor in a like manner. By minimizing the length and the number of curves in the air path, I am able to increase the ventilating efficiency of the motor, so that a higher rating may be applied to motors of a given size than was heretofore possible.

As shown in Fig. 1, the header 50 is made of gradually increasing depth toward the gear box. This increased depth provides a greater volume of air path in that portion of the header aligned with the gear box. Inasmuch as there are no openings in the end housing in this area, a greater size conduit must be provided to enable air escaping from the rotor at this area to flow without hindrance to the exhaust outlets 44. If desired, the openings 44 nearest the gear box may be made slightly larger to accommodate the greater volume of air flowing from the enlarged portion of the header. This construction is, of course, not necessary where no parts abut the pinion end closure, as is shown in Fig. 3. In such case the openings 44 can extend completely around the end housing, and the header 50 can be of uniform cross-section.

With reference to the ventilating system which I have depicted, it is important to note that all parts of the motor are symmetrically cooled. No particular hot spots will develop. This is an important feature of my invention, since by providing ready ingress of cooling air to the various ventilating ducts and ready egress of the heated air from the ventilating ducts uniform cooling is obtained.

While I have illustrated my invention in the form which I now believe to be the best mode of application thereof, it is obvious that many changes may be made which are within the spirit and scope of the novel ventilating system and structure which I have introduced. I desire, therefore, that the appended claims be given the broadest construction consistent with the language and limited only by the prior art; and in the appended claims, I further desire that the term "motor" be broadly construed and as including any dynamo-electric machine.

I claim as my invention:

1. In a ventilating system for an electric motor having an outside casing and electro-dynamic power-converting means comprising a stator and a rotor, said casing having an end air compartment therein, ventilating duct means in said motor for cooling said electro-dynamic means and directed axially of said motor, a header in said compartment in the form of an open-faced channel with the open face substantially perpendicular to the axis of said motor, each of said ducts having ends juxtaposed to the said open face of said channel, and conduit means from said header comprising spaced tubes within said compartment, opening into said header and extending in the same general direction as the axis of said motor to openings in said motor casing.

2. In a ventilating system for an electric motor having an outside casing and electro-dynamic power-converting means comprising a stator and a rotor, said casing having an end air compartment therein, ventilating duct means in said motor for cooling said electro-dynamic means and directed axially of said motor, a header in said compartment in the form of an open-faced channel with the open face substantially perpendicular to the axis of said motor, each of said ducts having ends juxtaposed to the said open face of said channel, and conduit means from said header comprising spaced tubes within said compartment, opening into said header and extending in the same general direction as the axis of said motor to openings in said motor casing, said tubes opening into said header substantially opposite the said ends of said ducts.

3. In an electric motor, a rotor having longitudinal ducts for the passage therethrough of a cooling medium, said ducts being divided into portions, one of which is inwardly and another outwardly, radially of the rotor, a compartment for the passage of cooling medium at one end of said rotor, and communicating with the end openings of the said inner portion of ducts, conduit means communicating with the openings of the said outer portion of ducts and having spaced tube branches passing through said compartment for defining a path for cooling medium, said path including the last said portion of ducts.

4. In an electric motor, a rotor having longitudinal ducts for the passage therethrough of a cooling medium, said ducts being divided into portions, one of which is inwardly and another outwardly, radially of the rotor; a compartment for the passage of cooling medium at one end of said rotor, and communicating with the end openings of the said inner portion of ducts, conduit means communicating with the openings of the said outer portion of ducts and having spaced tube branches passing through said compartment for defining a path for cooling medium, said path including the last said portion of ducts, said tubes extending in the same general direction as the ducts of said outer portion, and means at the other end of said rotor for directing cooling medium from one of said portion of ducts to another.

5. An electric motor comprising a stator, a rotor, and an end housing; said stator and rotor each having a circular series of longitudinal ventilating ducts, said end housing having ventilating openings spaced along a substantial portion of the circumference thereof, and forming with said stator and rotor a ventilating compartment, spaced tubular means extending through said compartment for directing the air flow between one of said series of ducts and said openings, said compartment having an opening through which ventilating medium is passed for the other of said series of ducts.

6. An electric motor comprising a stator, a rotor, and an end housing; said stator and rotor having a circular series of longitudinal ventilating ducts, said end housing having ventilating openings spaced along a substantial portion of the circumference thereof, and forming with said stator and rotor a ventilating compartment, said openings being substantially trapezoidal in shape with the shorter side toward the axis of said motor and with the sides thereof within an angle formed by radial lines to the greatest extent of said trapezoidal, and spaced tubular means of similar shape in cross-section for conducting air from said ducts to said openings.

7. An electric motor comprising a stator, a rotor, and an end housing; said stator and rotor each having a circular series of longitudinal ventilating ducts, said end housing having ventilating openings spaced along a substantial portion of the circumference thereof, and forming with said stator and rotor a ventilating compartment, a channel shaped header in said compartment with its open end juxtaposed to the outlets of one of said series of ducts, a plurality of tubes spaced to open into said header and fitting said end housing openings, said compartment having an opening through which ventilating medium is passed to flow through the other of said series of ducts whereby cooling medium flowing to last said series passes between said tubes.

8. An electric motor comprising, an outside frame, field structure supported thereby and providing ducts for ventilation, a rotor having a plurality of series of longitudinal ducts, an end housing providing an end air space in said motor and having ventilating openings, said openings being spaced along a substantial portion of a complete circumference, conduit means including a plurality of tubes and a header, said tubes extending from the periphery of said openings into said header, said header being juxtaposed to a series of said rotor ducts whereby to confine ventilating air to a path involving only the last said series, conduit means, and openings; another of said series of ducts opening into said end air space.

9. An electric motor comprising an outside frame, field structure supported thereby and providing ducts for ventilation, a rotor having a plurality of series of longitudinal ducts, an end housing providing an end air space in said motor and having ventilating openings, said openings being spaced along a substantial portion of a complete circumference, conduit means including a plurality of tubes and a header, said tubes extending from the periphery of said openings into said header, said header being juxtaposed to a series of said rotor ducts whereby to confine ventilating air to a path involving only the last said series, conduit means, and openings; another of said series of ducts opening into said end air space, the external diameter of said header being substantially the same as that of the rotor and the internal diameter of said header substantially the same as that of the innermost path of the cooperating ducts.

10. An electric motor comprising an outside frame, field structure supported thereby and providing ducts for ventilation, a rotor having a plurality of series of longitudinal ducts, an end housing providing an end air space in said motor and having ventilating openings, said openings being spaced along a substantial portion of a complete circumference, conduit means including a plurality of tubes and a header, said tubes extending from the periphery of said openings into said header, said header being juxtaposed to a series of said rotor ducts whereby to confine ventilating air to a path involving only the last said series, conduit means, end openings; another of said series of ducts opening into said end air space, the external diameter of said header being substantially the same as that of the rotor and the internal diameter of said header substantially the same as the internal path of the cooperating ducts, an end housing opposite the first said end housing and having ventilating openings, said end housing providing an air space in said motor, the first said ducts opening into the last said air space, and means providing a conduit for the passage of air between the first and second said series of motor ducts.

11. An electric motor comprising, a stator including a circuit collector end housing, and a pinion end housing having a circumferential row of ventilating openings; a rotor having ventilating ducts, and a cylindrical current collector member; the stator having a circumferential row of ventilating openings at each end, means for directing air from the circumferential row of said openings which are at the current collector end, and means for directing said air radially inwardly to the current collector cylinder and hence axially outwardly over the face thereof, said current collector end housing having discharge openings therefor; an air compartment formed in part by said pinion end housing, said compartment having an air intake, and communicating directly with said stator openings at the pinion end and with a plurality of said ducts of said rotor; stationary spaced air conduits, means in said compartment communicating directly with said other of said ducts of said rotor and extending to the said openings in said pinion end housing.

12. In an electric motor, a rotor having longitudinal ducts for the passage therethrough of a cooling medium, said ducts being divided into portions, one of which is inwardly and another outwardly, radially of the rotor; a compartment for the passage of cooling medium at one end of said rotor, and communicating with the end openings of the inner said portion of ducts, conduit means communicating with the openings of the outer portion of ducts and having spaced tube branches passing through said compartment for defining a path for cooling medium, said path including the last said portion of ducts, said conduit means comprising a channel-shaped header opening toward said outer portion of ducts.

13. The structure of claim 1 characterized by said motor casing having an air intake at the end of said motor at which said header is disposed.

14. The structure of claim 2 characterized by said motor casing having an air intake at the end of said motor at which said header is disposed.

ERICH O. MUELLER.